(12) United States Patent
Gerlach et al.

(10) Patent No.: US 7,490,148 B1
(45) Date of Patent: *Feb. 10, 2009

(54) COMPLETION PERFORMANCE ANALYSIS FOR INTERNET SERVICES

(75) Inventors: Richard J. Gerlach, Roswell, GA (US); Charles S. Shull, Marietta, GA (US); David Edward Haslam, Atlanta, GA (US); Tim Hill, Kennesaw, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 764 days.

This patent is subject to a terminal disclaimer.

(21) Appl. No.: 10/158,816

(22) Filed: May 30, 2002

(51) Int. Cl.
*G06F 15/173* (2006.01)
(52) U.S. Cl. .............................. 709/224; 709/203; 707/7
(58) Field of Classification Search ................. 709/224, 709/204; 707/7
See application file for complete search history.

(56) References Cited

U.S. PATENT DOCUMENTS

| | | | |
|---|---|---|---|
| 5,442,771 A | 8/1995 | Filepp et al. | |
| 5,799,304 A | 8/1998 | Miller | |
| 5,870,558 A | 2/1999 | Branton, Jr. et al. | |
| 5,974,572 A | 10/1999 | Weinberg et al. | |
| 6,016,475 A * | 1/2000 | Miller et al. ................... | 705/1 |
| 6,038,601 A | 3/2000 | Lambert et al. | |
| 6,072,800 A | 6/2000 | Lee | |
| 6,138,157 A | 10/2000 | Welter et al. | |
| 6,157,940 A | 12/2000 | Marullo et al. | |
| 6,314,463 B1 | 11/2001 | Abbott et al. | |
| 6,356,936 B1 * | 3/2002 | Donoho et al. .............. | 709/206 |
| 6,359,635 B1 * | 3/2002 | Perttunen .................... | 715/834 |
| 6,393,386 B1 | 5/2002 | Zager et al. | |
| 6,393,480 B1 | 5/2002 | Qin et al. | |
| 6,438,592 B1 | 8/2002 | Killian | |
| 6,446,120 B1 | 9/2002 | Dantressangle | |
| 6,449,739 B1 | 9/2002 | Landan | |
| 6,546,390 B1 * | 4/2003 | Pollack et al. ................. | 707/7 |
| 6,546,488 B2 * | 4/2003 | Dillon et al. ................ | 713/181 |
| 6,571,285 B1 | 5/2003 | Groath et al. | |
| 6,633,907 B1 | 10/2003 | Spencer et al. | |
| 6,687,746 B1 | 2/2004 | Shuster et al. | |
| 6,701,363 B1 * | 3/2004 | Chiu et al. .................. | 709/224 |

(Continued)

FOREIGN PATENT DOCUMENTS

GB    2346229    8/2000

(Continued)

OTHER PUBLICATIONS

WebUseNet Network Statistics; Entitled: BellSouth NTTP Statistics; http://stats.bs.webusenet.com; main page; 1 page, publicly available prior to May 30, 2002.

(Continued)

*Primary Examiner*—Tonia L Dollinger
*Assistant Examiner*—Kyung H Shin
(74) *Attorney, Agent, or Firm*—Thomas, Kayden, Horstemeyer & Risley, LLP

(57) ABSTRACT

One preferred embodiment of the present invention provides a system and method for analyzing the completion performance of newsgroup services. Briefly described, in architecture, one embodiment of the system, among others, includes a newsgroup evaluation system configured to determine a completion rate for a newsgroup server. The completion rate is saved and displayed to a user. Methods and other systems are also provided.

56 Claims, 6 Drawing Sheets

U.S. PATENT DOCUMENTS

| | | |
|---|---|---|
| 6,738,813 B1 | 5/2004 | Reichman |
| 6,754,701 B1 | 6/2004 | Kessner |
| 6,757,543 B2 * | 6/2004 | Moran et al. ............. 455/456.1 |
| 6,775,661 B1 | 8/2004 | Redner |
| 6,789,050 B1 | 9/2004 | Reeser et al. |
| 6,795,858 B1 | 9/2004 | Jain et al. |
| 6,810,411 B1 | 10/2004 | Coughlin et al. |
| 6,862,622 B2 | 3/2005 | Jorgensen |
| 6,862,623 B1 | 3/2005 | Odhner et al. |
| 6,879,998 B1 | 4/2005 | Raciborski et al. |
| 6,889,257 B1 | 5/2005 | Patel |
| 2001/0029537 A1 | 10/2001 | Klein |
| 2002/0042823 A1 | 4/2002 | DeBettencourt et al. |
| 2002/0087636 A1 | 7/2002 | Matsuda et al. |
| 2002/0112049 A1 | 8/2002 | Elnozahy et al. |
| 2002/0152303 A1 | 10/2002 | Dispensa |
| 2002/0167942 A1 | 11/2002 | Fulton |
| 2003/0110293 A1 | 6/2003 | Friedman et al. |
| 2003/0187998 A1 | 10/2003 | Petit |
| 2003/0188263 A1 | 10/2003 | Bates et al. |
| 2003/0204588 A1 | 10/2003 | Peebles et al. |
| 2003/0204781 A1 | 10/2003 | Peebles et al. |
| 2003/0217144 A1 | 11/2003 | Fu et al. |
| 2003/0221000 A1 | 11/2003 | Cherkasova et al. |
| 2005/0076111 A1 | 4/2005 | Cherkasova et al. |

OTHER PUBLICATIONS

WebUseNet Network Statistics; Entitled: BellSouth NTTP Statistics; http://stats.bs.webusenet.com; Subheading: Network Statistics; 1 page, publicly available prior to May 30, 2002.

WebUseNet Network Statistics; Entitled: BellSouth NTTP Statistics; http://stats.bs.webusenet.com; Subheading: Port Statistics; 1 page, publicly available prior to May 30, 2002.

Gerlach; U.S. Appl. No. 10/159,311, filed May 30, 2002.

Gerlach; U.S. Appl. No. 10/197,964, filed Jul. 16, 2002.

Gerlach; Non- Final Rejection mailed Jul. 13, 2005; U.S. Appl. No. 10/159,311, filed May 30, 2002.

Gerlach; Examiner Interview Summary Record mailed Sep. 23, 2005; U.S. Appl. No. 10/159,311, filed May 30, 2002.

Gerlach; Final Rejection mailed Dec. 27, 2005; U.S. Appl. No. 10/159,311, filed May 30, 2002.

Gerlach; Non- Final Rejection mailed Jun. 29, 2006; U.S. Appl. No. 10/159,311, filed May 30, 2002.

Gerlach; Final Rejection mailed Dec. 15, 2006; U.S. Appl. No. 10/159,311, filed May 30, 2002.

Gerlach; Non- Final Rejection mailed Aug. 17, 2005; U.S. Appl. No. 10/197,964, filed Jul. 16, 2002.

Gerlach; Examiner Interview Summary Record mailed Oct. 24, 2005; U.S. Appl. No. 10/197,964, filed Jul. 16, 2002.

Gerlach; Final Rejection mailed Jan. 27, 2006; U.S. Appl. No. 10/197,964, filed Jul. 16, 2002.

Gerlach; Non- Final Rejection mailed Jun. 20, 2006; U.S. Appl. No. 10/197,964, filed Jul. 16, 2002.

Gerlach; Non- Final Rejection mailed Nov. 22, 2006; U.S. Appl. No. 10/197,964, filed Jul. 16, 2002.

Gerlach; Final Rejection mailed Mar. 20, 2007; U.S. Appl. No. 10/197,964, filed Jul. 16, 2002.

* cited by examiner

US 7,490,148 B1

COMPLETION PERFORMANCE ANALYSIS FOR INTERNET SERVICES

TECHNICAL FIELD

The present invention is generally related to the Internet and, more particularly, is related to systems and methods for analyzing the performance of Internet services.

BACKGROUND OF THE INVENTION

An Internet service provider (ISP) typically provides a core group of Internet utilities and service to its customers. Core services often include newsgroups along with Email, World Wide Web (WWW), File Transfer Protocol (FTP), Telnet, Internet Relay Chat (IRC), etc. Newsgroups typically include a collection of topical message boards that ISP customers may post to and read messages from. The most widely available distribution of newsgroups is Usenet.

Usenet currently refers to a collection of approximately 90,000 newsgroups and is operated on thousands of newsgroup servers over the Internet or on networks employing the network news transfer protocol (NNTP). To distribute messages or articles within the network, a local newsgroup server for an ISP communicates with other newsgroup servers and compares newsgroup databases. A newsgroup server requests and receives from other servers any messages that the newsgroup server does not have. An ISP customer or newsgroup user may then access his or her local newsgroup server and retrieve messages from the local newsgroup server.

Articles or messages submitted to newsgroups are designed for discussion and are only accepted as text files. However, a binary file can be posted to newsgroups by converting the binary file to a text file. One way to post a binary file on a newsgroup is to use a program supporting UUEncode. UUEncode encodes binary data into a text message that may be posted on a newsgroup. Once posted, a user may retrieve the article or posting from the newsgroup to his or her computer and reconvert the file back to binary data using a UUDecode program. MIME (Multipurpose Internet Mail Extensions), a method used to add binary attachments to email, is another process for encoding binary data into a text message.

Newsgroups are organized into hierarchies based on subject distinctions. For example, several newsgroups are dedicated to binary postings. Binary postings tend to be very large as compared to text postings and do not transmit easily. In fact, some newsgroup servers prohibit posting of articles that are larger than a specific size. Therefore, a system called "Multipart Message" may be used to break up a large binary message into smaller message parts. In the system, many small messages are posted to a newsgroup, rather than one large message. A user may then retrieve all the message parts and reassemble them into a single binary file. A multipart message is identified by examining the end of a message's subject line. All the parts of a multipart message will have a subject line that ends with [xx/yy]. For example, the first part of a 10 part message will end with [01/10] and the fifth part will end with [05/10], etc.

To retrieve or download messages, a user may use a separate newsreader program or a WWW browser with an inbuilt newsreader. The newsreader accesses the ISP's local newsgroup server, enabling a user to pull down as many newsgroups and articles as the user desires. However, to make newsgroups available to users, the ISP's newsgroup server has to dedicate hard drive space for storage. Accordingly, newsgroup articles are only available to users for a limited time before they are deleted to make room for new article postings.

Completion refers to how often all parts of a multipart binary message are available at the same time at one newsgroup. Since all parts of a multipart message are needed to completely reassemble a binary file, it is important for all the parts to be accessible in a newsgroup. Therefore, a completion rate may be specified as a percentage of all the multipart files that are present in a newsgroup at the same time. If a newsgroup has a poor completion rate, then a user probably cannot successfully retrieve and enjoy much of the content in the newsgroup.

Therefore, for an ISP to assess the quality of newsgroup service that it provides to its customers, an ISP needs a legitimate way to test the characteristics of newsgroup service. Thus, a heretofore unaddressed need exists in the industry to address the aforementioned deficiencies and inadequacies.

SUMMARY OF THE INVENTION

Preferred embodiments of the present invention provide a system and method for analyzing completion performance of newsgroup services. Briefly described, in architecture, one embodiment of the system, among others, can be implemented as follows. A newsgroup server supplies newsgroup access to an Internet service provider (ISP). To evaluate the performance of the newsgroup service, a newsgroup evaluation system communicates with the Internet service provider and performs an evaluation task on the newsgroup server to determine completion performance.

One preferred embodiment of the present invention can also be viewed as providing methods for analyzing the completion performance of a newsgroup service. In this regard, one embodiment of such a method, among others, can be broadly summarized by the following steps: determining a completion rate for a newsgroup server; and saving the completion rate.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
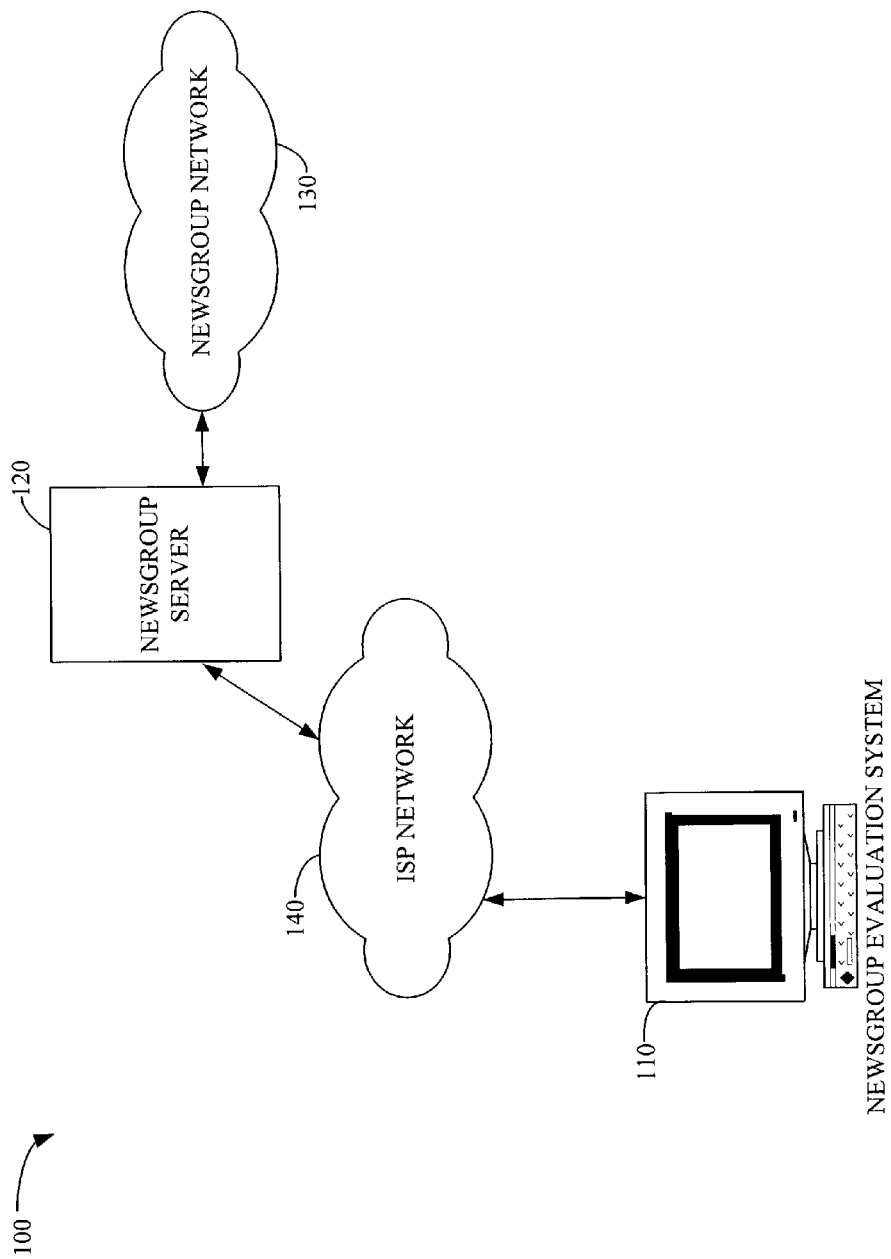
FIG. 1 is a schematic representation of a system for newsgroup performance analysis according to one preferred embodiment of the present invention.

Depicted in FIG. 1 is a representative embodiment of a system for newsgroup performance analysis 100 of the present invention. As shown in FIG. 1, system 100 includes a newsgroup evaluation system 110 that is adapted to monitor the quality of service being provided by a newsgroup provider to an ISP. The newsgroup provider supplies newsgroup service to an ISP by providing the ISP access to a newsgroup server 120 that stores messages posted directly to the server via ISP network 140 or stores messages received from the newsgroup network 130. As described in greater detail hereinafter, the newsgroup evaluation system 110 acquires objective information from the newsgroup server 120 that is relevant to evaluating the quality of service being provided by the newsgroup provider to an ISP. In this regard, the newsgroup evaluation system 110 communicates with the newsgroup server 120 via an ISP network 140. As described in greater detail hereinafter, the newsgroup evaluation system 110 generates output data in various formats based upon the intent of the user.

The ISP network 140 is the communication network available to an ISP and its customers. Typically, the ISP network 140 provides access to Internet services such as email, FTP, WWW, IRC, etc. and newsgroups via the newsgroup server 120. The newsgroup server 120 stores and forwards newsgroup articles throughout the newsgroup network 130 that the newsgroup server 120 receives from other newsgroup servers or that the newsgroup server 120 receives from a local user posting. The newsgroup network 130 is composed of newsgroup servers 120 that provide access to a collection of newsgroups, such as Usenet. Newsgroup network 130 may be any type of newsgroup network such as the Internet or a network employing a newsgroup protocol such as, Network News Transfer Protocol (NNTP), for example.

The newsgroup evaluation system 110 has access to the newsgroup server 120. Typically, access is provided through the ISP network 140. The newsgroup evaluation system 110 evaluates the performance of a newsgroup service provider by monitoring the quality of newsgroup services being provided. In particular, the newsgroup evaluation system 110 analyzes the completion rate of the newsgroup server 120.

I. Architecture

The newsgroup evaluation system 110 of the present invention can be implemented in software, firmware, hardware, or a combination thereof. Preferably, the newsgroup evaluation system 110 is implemented in software, as an executable program, and is executed by a special or general purpose digital computer, such as a personal computer, workstation, minicomputer, or mainframe computer. An example of a general purpose computer that can implement the newsgroup evaluation system of one preferred embodiment of the present invention is shown in FIG. 2.

Figure 2:
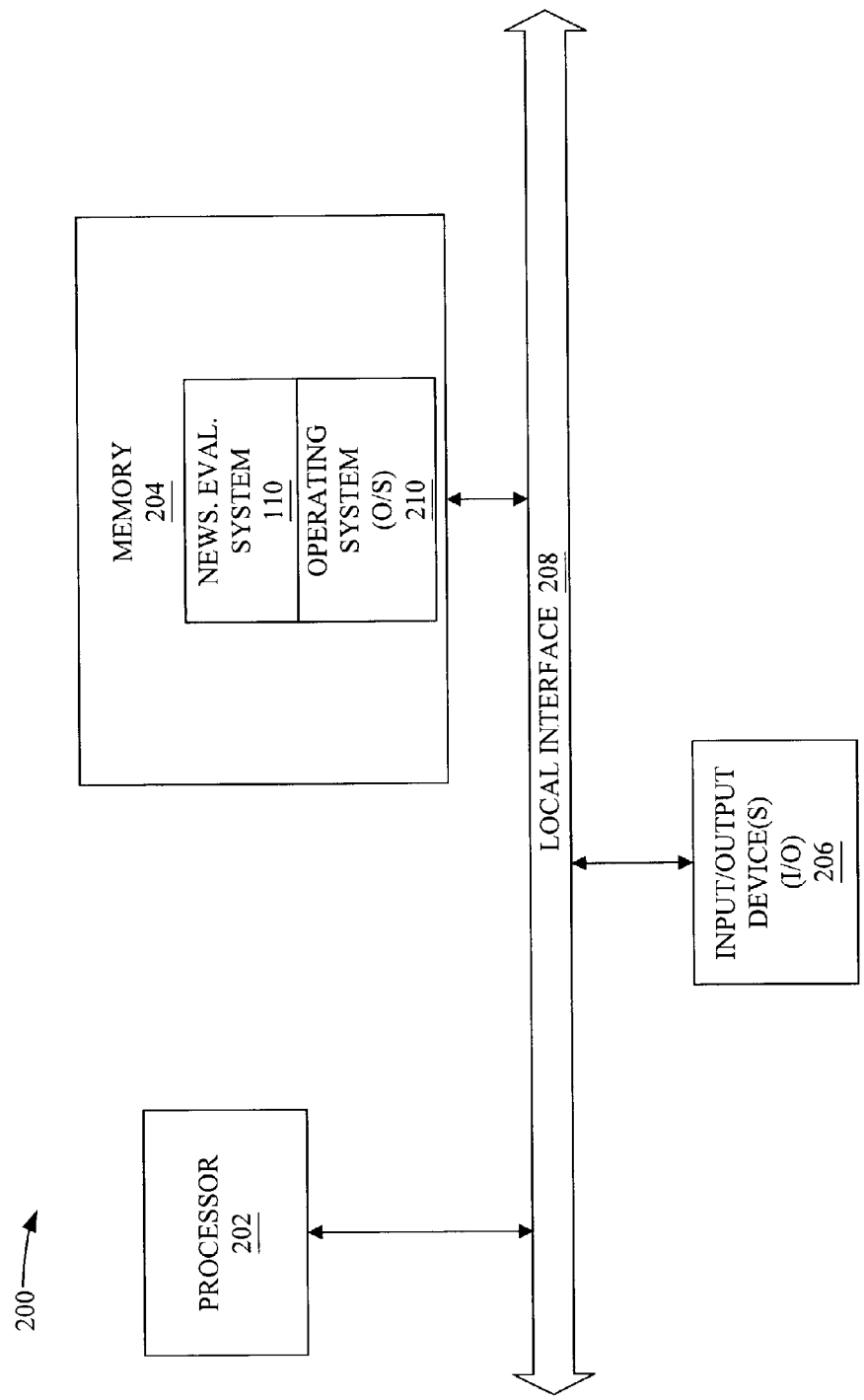
FIG. 2 is a schematic representation of an implementation of the newsgroup evaluation system in FIG. 1 using a general computer system.

Generally, in terms of hardware architecture, as shown in FIG. 2, the computer 200 includes a processor 202, memory 204, and one or more input and/or output (I/O) devices 206 (or peripherals) that are communicatively coupled via a local interface 208. The local interface 208 can be, for example but not limited to, one or more buses or other wired or wireless connections, as is known in the art. The local interface 208 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 202 may be a hardware device for executing software that can be stored in memory 204. The processor 202 can be any custom made or commercially available processor, a central processing unit (CPU) or an auxiliary processor among several processors associated with the computer 200, and a semiconductor based microprocessor (in the form of a microchip) or a macroprocessor.

The memory 204 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 204 may incorporate electronic, magnetic, optical, and/or other types of storage media. Note that the memory 204 can have a distributed architecture, where various components are situated remote from one another, but can be accessed by the processor 202.

The software in memory 204 may include one or more separate programs, each of which comprises an ordered listing of executable instructions for implementing logical functions. In the example of FIG. 2, the software in the memory 204 includes the newsgroup evaluation system 110 and an operating system (O/S) 210. The operating system 210 essentially controls the execution of other computer programs, and provides scheduling, input-output control, file and data management, memory management, and communication control and related services.

The newsgroup evaluation system 110 may be a source program, executable program (object code), script, or any other entity comprising a set of instructions to be performed. If the newsgroup evaluation system 110 is a source program, then the program needs to be translated via a compiler, assembler, interpreter, or the like, which may or may not be included within the memory 204, so as to operate properly in connection with the O/S 210. Furthermore, the newsgroup evaluation system 110 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 206 may include input devices, for example but not limited to, a keyboard, mouse, scanner, digital camera, multi-function device, digital sender, microphone, etc. Furthermore, the I/O devices 206 may also include output devices, for example but not limited to, a printer, display, etc. Finally, the I/O devices 206 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 200 is a PC, workstation, or the like, the software in the memory 204 may further include a basic input output system (BIOS) (omitted for simplicity). The BIOS is a set of essential software routines that initialize and test hardware at startup, start the O/S 210, and support the transfer of data among the hardware devices. The BIOS is stored in ROM so that the BIOS can be executed when the computer 200 is activated.

When the computer 200 is in operation, the processor 202 is configured to execute software stored within the memory 204, to communicate data to and from the memory 204, and to generally control operations of the computer 200 pursuant to the software. The newsgroup evaluation system 110 and the O/S 210, in whole or in part, but typically the latter, are read by the processor 202, perhaps buffered within the processor 202, and, then executed.

When the newsgroup evaluation system 110 is implemented in software, as is shown in FIG. 2, it should be noted that the newsgroup evaluation system 110 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The newsgroup evaluation system 110 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the newsgroup evaluation system 110 is implemented in hardware, the newsgroup evaluation system 110 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

II. Operation

The flowcharts of FIGS. 3-7 show the functionality of a representative implementation of the newsgroup evaluation system 110 of the present invention. It should also be noted that in some alternative implementations the functions noted in the various blocks may occur out of the order depicted in the flowcharts of FIGS. 3-7. For example, two blocks shown in succession in FIG. 3 may, in fact, be executed substantially concurrently. Alternatively, the blocks may sometimes be executed in the reverse order depending upon the functionality involved.

Figure 3:
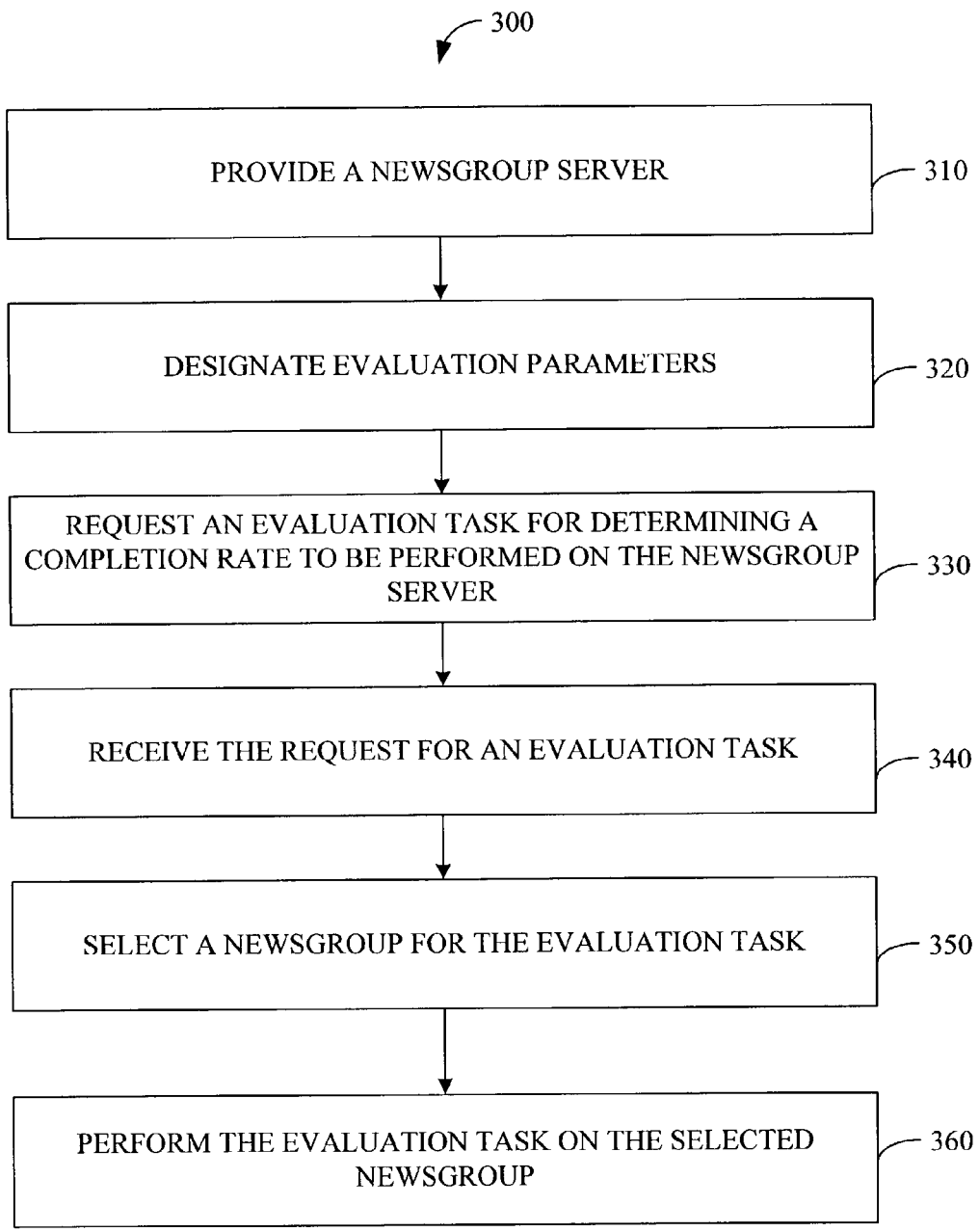
FIG. 3 is a flowchart describing the functionality of a representative embodiment of the newsgroup evaluation system in FIG. 1.

As depicted in FIG. 3, the functionality of a representative embodiment of the newsgroup evaluation system 110 or method 300 may be construed as beginning at block 310. In block 310, a newsgroup server 120 supplying newsgroup service is provided. In block 320, evaluation parameters for an evaluation task are designated. The evaluation task involves the determination of a completion rate for the newsgroup server 120. The completion rate is the percentage of all the parts of multipart articles that are present on the newsgroup server 120. Evaluation parameters include the criteria for determining this completion rate.

One of the criteria in the evaluation parameters is the minimum completion limit for a newsgroup. The completion limit is the minimum acceptable completion rate for a newsgroup. For example, a completion limit of 85% signifies that 85% of multipart articles in a newsgroup should have all their parts present. Additional evaluation parameters include the name of a newsgroup to be examined; and the minimum size limit of a newsgroup. These evaluation parameters will be discussed in more detail hereinafter.

In block 330, a request is generated to perform the evaluation task on the newsgroup server 120. The request may be made by a command from a user such as a keystroke from a keyboard or a mouse input. In some embodiments of the invention, a user may schedule for requests of evaluation tasks to be generated. For example, a user may schedule an evaluation task to be performed at the same time every week, several times an hour, etc. Then on the scheduled time and day, a request will automatically be generated for performance of the evaluation task.

Once a request is received in block 340, a newsgroup is selected to be the subject of the evaluation task, as depicted in block 350. In the evaluation parameters, a particular newsgroup may be designated. Therefore, a known newsgroup that has numerous multipart postings may be desired to be the subject of the evaluation task. As depicted in block 360, the evaluation task is performed on the selected newsgroup by determining a completion rate for the newsgroup. An alternative newsgroup could also be designated in the evaluation parameters for performing an evaluation task if an evaluation task cannot be performed on a primary newsgroup.

Evaluation parameters may further include a newsgroup size limit to ensure that a newsgroup has a large number of postings before an evaluation task will be performed. For example, a newsgroup size limit may be set at 100 postings which is an average of 20 postings a day for a retention period of 5 days. If a newsgroup does not satisfy the newsgroup size limit, then the evaluation task would not be performed, since it might be felt that there are not enough articles in the newsgroup to obtain a completion rate.

Figure 4:
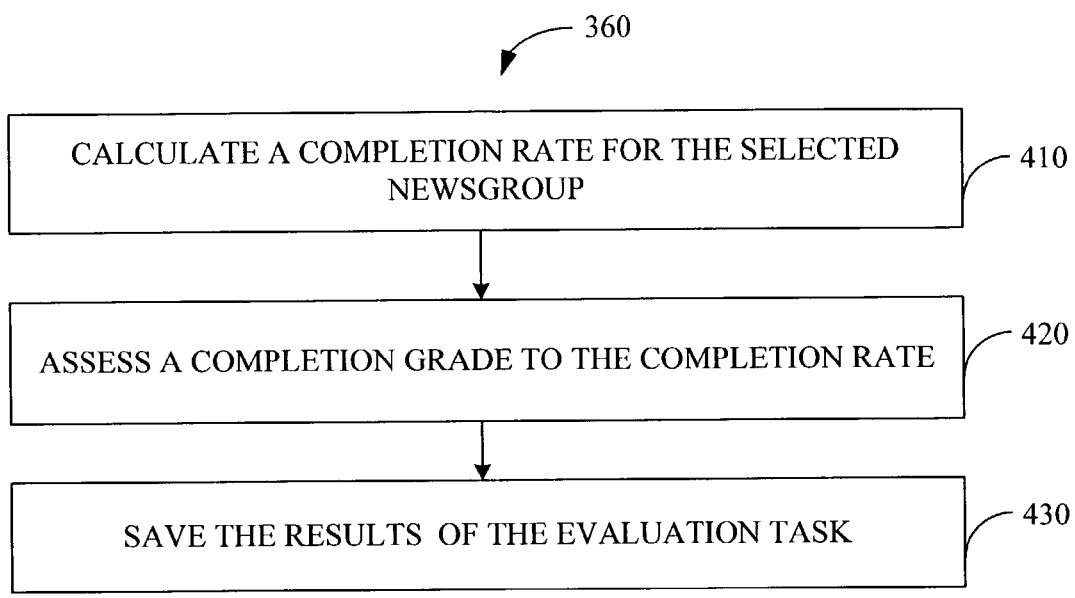
FIG. 4 is a flowchart describing the process of performing the evaluation task in FIG. 3.

Referring now to the flowchart of FIG. 4, the performance of the evaluation task 360 is described in greater detail for a representative implementation of the invention. In block 410, a completion rate is calculated for the selected newsgroup. One manner of determining the completion rate for a particular newsgroup is for the newsgroup evaluation system 110 to retrieve the list of the newsgroup's article heading, including the subject of each article. From each article's subject heading, the newsgroup evaluation system 110 can ascertain: (a) if the article is part of a multipart article; (b) the number of parts in the multipart article; and (c) the particular part number the article is, if the article is part of a multipart article. Therefore, the newsgroup evaluation system 110 can ascertain how many multipart articles are in the newsgroup and can also ascertain how many of these multipart articles have all of their smaller parts present in the newsgroup. A completion rate can then be calculated reflecting the percentage of multipart articles that are complete and can be successfully reassembled in the newsgroup.

After the completion rate is calculated, the completion rate is compared to the minimum completion limit and is assessed a completion grade, as shown in block 420. The minimum completion limit is specified in the evaluation parameters. Once the completion rate for a newsgroup is calculated, the completion rate may be compared to the minimum completion limit for the newsgroup. If the completion rate is less than the minimum completion limit, then a completion grade of FAILURE is assessed to the completion rate. Otherwise, a completion grade of PASSING is assessed. In an earlier example, the minimum completion limit for a newsgroup was 85%. Therefore, if the completion rate for a newsgroup is calculated to be 60%, the completion rate is less than the minimum completion limit for that newsgroup. Accordingly, the completion rate is a FAILURE. In block 430, the results of the evaluation task comparison are saved.

Figure 5:
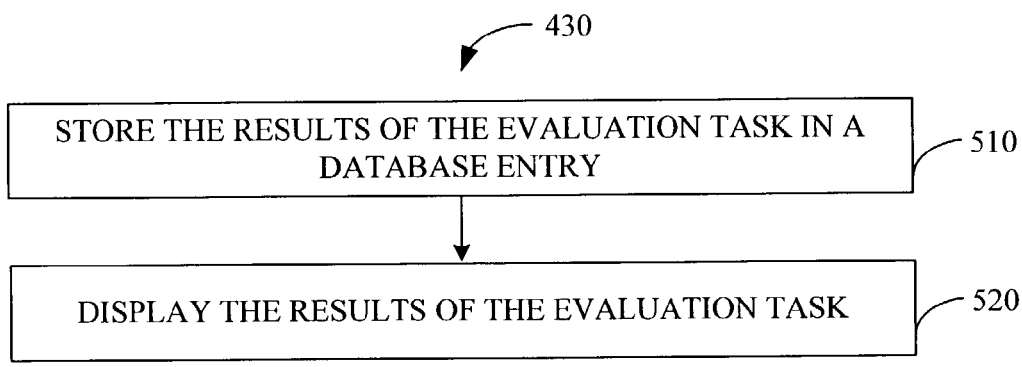
FIG. 5 is a flowchart describing the process of saving the results of the evaluation task in FIG. 4.

Referring now to the flowchart of FIG. 5, the saving of the results from the evaluation task 430 is described in greater detail for a representative implementation of the invention. In block 510, the completion rate and grade for the newsgroup is stored on a storage medium such as a hard drive of a computer. In one embodiment, the completion rate and the completion grade are logged as an entry in a record-keeping database located on the hard drive of the computer. In addition to the completion rate, other information, such as the name of the newsgroup that was the subject of the evaluation task, and the date and time the completion rate was determined, can also be stored. In block 520, the results of the evaluation task are displayed to a user of the newsgroup evaluation system 110.

Figure 6:
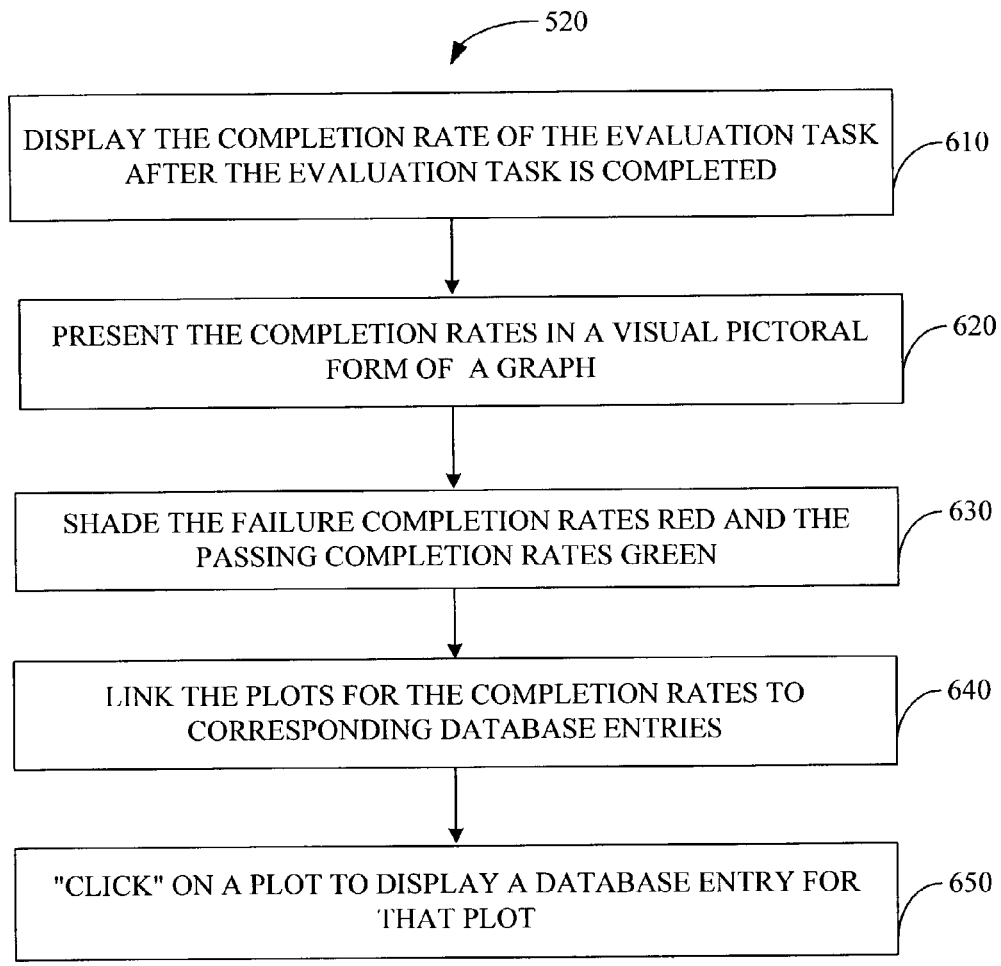
FIG. 6 is a flowchart describing the process of displaying the results of the evaluation task in FIG. 5.

Referring now to the flowchart of FIG. 6, the displaying of the results from the evaluation task 520 is described in greater detail for a representative implementation of the invention. In block 610, the completion rate of the evaluation task and the completion grade are displayed to the user after the evaluation task is completed. Depending upon the intent of the user, the completion rate and grade may be displayed with other relevant information such as the date and time the evaluation task was completed. A user may also retrieve prior results from evaluation tasks since, earlier completion rates and grades are stored on a storage medium.

The completion rates may be presented to a user in a visual pictorial form, such as a graph, table, or chart. In FIG. 6, block 620 depicts the completion rate being plotted on a graph. The graph may also represent the completion grade for the corresponding completion rate. As depicted in block 630, a plot of a completion rate that was a FAILURE may be shaded one color, e.g. red, while a plot of a complete rate that was PASSING may be shaded in another color, e.g. green. Further in block 640, the plots of the completion rates on the graph may be linked to the corresponding database entry for that completion rate, so that a user may click on the plot on the graph for a completion rate and have the entry for that particular completion rate from the database be retrieved and displayed to the user, as depicted in block 650. It is contemplated that a user of the newsgroup evaluation system 110 can configure outputs to conform to the user's needs and preferences.

Figure 7:
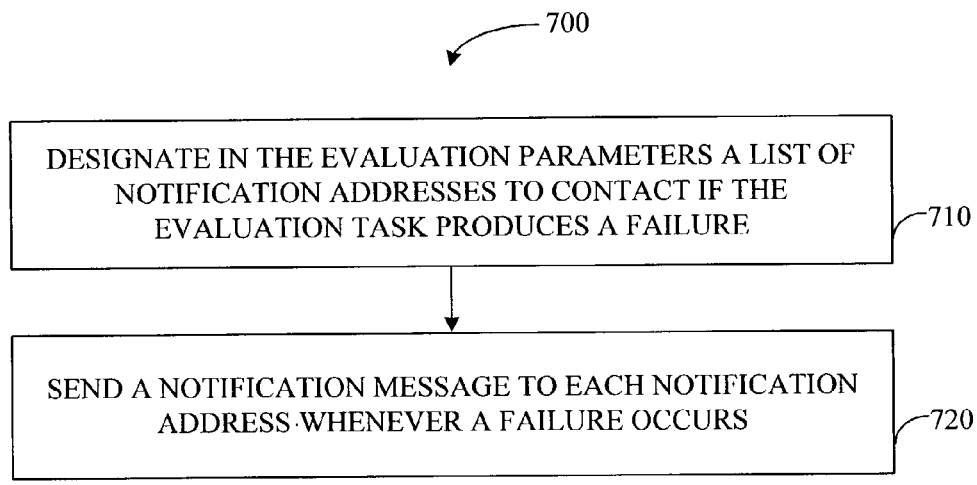
FIG. 7 is a flowchart describing the process of sending notification messages according to one preferred embodiment of the present invention.

For example, for a completion rate that receives a completion grade of FAILURE, a representative implementation of one preferred embodiment of the present invention sends a notification message to designated recipients, as shown by the flowchart of FIG. 7. In block 710, the evaluation parameters include a list of notification addresses that notification messages are sent to, whenever a FAILURE occurs. The notification list can include an address for one person, multiple addresses for one person, or addresses for more than one person. Typically, the notification address is an email address that can be used to send an email message over the Internet to a person's computer or through wireless communications to a person's wireless communication device, such as, among others, a cell phone or interactive pager. In alternative embodiments, however, the notification address could be an address for other messaging technologies such as instant messaging, for example. When a completion rate is lower than the minimum completion limit for that newsgroup, a notification message is sent to the notification addresses in the notification list, as shown in block 720. This is known as a FAILURE result. The notification message informs the recipient that the newsgroup service is not performing at a desired standard. The content of the message contains relevant information about the failed evaluation task such as the name of the newsgroup, the completion rate, and the date and time that the evaluation task took place. In alternative implementations of the invention, different FAILURE count levels (e.g. 5 FAILURES out of 100 completion evaluation tasks, 10 FAILURES in a one month period, etc.) may be tracked to trigger the transmission of notification messages. Accordingly, an ISP can then gauge the quality of newsgroup service being provided by its newsgroup service provider and request compensation from the newsgroup service provider if the service is not satisfactory. Advantageously, the above-described embodiments of the present invention, assess the completion performance of a newsgroup service. It should be emphasized that the above-described embodiments of the present invention are merely possible examples of implementations, merely set forth for a clear understanding of the principles of the invention. Many variations and modifications may be made to the above-described embodiment(s) of the invention without departing substantially from the principles of the invention. For example, the network evaluation system may randomly select a newsgroup to be the subject of an evaluation task. Also, FAILURE count levels could be compiled from completion rates calculated from more than one newsgroup.

If a newsgroup produces a FAILURE, then the network evaluation system could also send notification messages in the form of voice messages to listed telephone numbers in the evaluation parameters. All such modifications and variations are intended to be included herein within the scope of this disclosure and the present invention and protected by the following claims.

Therefore, having thus described the invention, at least the following is claimed:

1. A method for assessing completion performance of a newsgroup service provided by a newsgroup server whereby the newsgroup server provides an on-line forum for users of an Internet Service Provider (ISP), the on-line forum having a plurality of interest groups such that one or more users of the ISP post newsgroup articles that are maintained by the newsgroup server on behalf of the ISP and at least one newsgroup article is transferred to a newsreader of a user, the method comprising:

selecting a newsgroup topic as a subject of a newsgroup completion assessment to be used in evaluating a newsgroup server and quality of newsgroup service being provided by the newsgroup server to a service provider;

determining a current rate of completion of the newsgroup topic on the newsgroup server, the current rate of completion indicating a percentage of the total number of multipart newsgroup articles that have been delivered and stored on the newsgroup server with all of their sub-parts for the newsgroup topic such that a user may access all of the sub-parts and subsequently reassemble the sub-parts into a complete newsgroup article;

comparing the current rate of completion to a minimum completion limit and assigning a completion grade; and saving the result of the newsgroup completion assessment so that the assessment of the newsgroup server may be subsequently conveyed to an interested party.

2. The method of claim 1, the method further comprising:
receiving a request to perform the newsgroup completion assessment; and
determining a newsgroup for the newsgroup completion assessment by choosing a newsgroup topic that satisfy criteria stated in evaluation parameters.

3. The method of claim 2, wherein performing a newsgroup completion performance assessment comprises:
calculating a completion rate of the newsgroup, the completion rate indicating a percentage of multipart newsgroup articles that are complete and can be successfully reassembled; and
displaying the completion rate.

4. The method of claim 3, wherein the evaluation parameters comprise a minimum size limit of newsgroup articles that a newsgroup contains before the completion rate is to be calculated.

5. The method of claim 3, wherein the evaluation parameters comprise a completion limit and a newsgroup completion assessment comprises assessing a completion grade to the completion rate based on the completion limit.

6. The method of claim 2, wherein the evaluation parameters comprise a scheduling time for performing the newsgroup completion assessment.

7. The method of claim 6, further comprising:
receiving a request to perform the newsgroup completion assessment, wherein the request to perform the newsgroup completion assessment is automatically generated in conformance with the scheduling time.

8. The method of claim 1, wherein performing of the newsgroup completion assessment is responsive to a manual request.

9. The method of claim 2, wherein the evaluation parameters include a name of a particular newsgroup topic that is to be evaluated, wherein determining a newsgroup topic for the newsgroup completion assessment comprises selecting the newsgroup topic named in the evaluation parameters.

10. The method of claim 3, wherein saving the result of the newsgroup completion assessment comprises:
storing the completion rate;
storing the date the completion rate was determined; and
storing the time the completion rate was determined.

11. The method of claim 5, wherein saving the result of the newsgroup completion assessment comprises:
storing the completion rate; and
storing the completion grade.

12. The method of claim 3, wherein displaying the completion rate comprises:
plotting the completion rate on a graph; and
displaying the graph.

13. The method of claim 3, wherein displaying the completion rate comprises:
creating an entry in a database for the completion rate; and
recording the completion rate in the entry.

14. The method of claim 13, wherein displaying the completion rate further comprises:
plotting the completion rate on a graph;
linking a plot on the graph to the corresponding entry in the database;
activating a plot on the graph; and
displaying the corresponding database entry for the plot.

15. The method of claim 5, wherein displaying the completion rate comprises:
creating an entry in a database for the completion rate;
recording the completion rate in the entry; and
recording the completion grade in the entry.

16. The method of claim 5, wherein displaying the completion rate further comprises:
plotting the completion rate on a graph;
shading the plot on the graph a particular color for a particular completion grade of the plot; and
displaying the graph.

17. The method of claim 5, wherein the evaluation parameters include a list of notification addresses to contact for a completion grade that is a FAILURE, the method further comprising:
after determining that the completion grade is a FAILURE, sending a notification to each notification address.

18. The method of claim 17, wherein the notification address is an email address.

19. The method of claim 17, wherein the notification address is a telephone number.

20. The method of claim 17, wherein in the notification address is an instant messaging address.

21. The method of claim 5, wherein the evaluation parameters include a list of notification addresses and a minimum failure count, the method further comprising:
after performing a series of newsgroup completion performance assessments, tracking the number of completion grades that are a FAILURE; and
after determining the number of the completion grades that are a FAILURE for the series, sending a notification message to each notification address if the number is equal to or more than the minimum failure count.

22. A system for assessing completion performance, comprising:
a newsgroup evaluation computer communicating with a service provider, wherein the newsgroup evaluation computer is configured to:
select a newsgroup topic as a subject of a newsgroup completion assessment to be used in evaluating a quality of newsgroup service being provided by a newsgroup server to the service provider;
calculate a completion rate of the newsgroup topic on the newsgroup server, the completion rate indicating a percentage of a total number of multipart newsgroup articles that have been delivered and stored on the newsgroup server with all of their sub-parts for the newsgroup topic such that a user may access all of the sub-parts and subsequently reassemble the sub-parts into a complete newsgroup article;
compare the current completion rate to a minimum completion limit and assign a completion grade; and
save the result of the newsgroup completion assessment so that the assessment of the newsgroup service may be subsequently conveyed to an interested party, wherein:
the newsgroup server provides newsgroup access to an Internet Service Provider (ISP), the newsgroup server structured to facilitate an on-line forum for users of the ISP, the on-line forum having a plurality of interest groups such that one or more users post newsgroup articles that are maintained by the newsgroup server, the newsgroup articles being associated with a respective interest group, the newsgroup server operable to transfer at least one posted newsgroup article associated with at least one respective interest group to a newsreader of a user.

23. The system of claim 22, wherein the newsgroup evaluation computer is further configured to:
receive a request to calculate the completion rate;
determine a newsgroup topic upon which to calculate the completion rate by choosing a newsgroup topic that satisfies criteria stated in evaluation parameters; and
display the completion rate.

24. The system of claim 23, wherein the evaluation parameters include a minimum size limit of newsgroup articles that a newsgroup topic contains before the completion rate is to be calculated.

25. The system of claim 23, wherein the evaluation parameters include a completion limit, the newsgroup evaluation computer further configured to assess a completion grade to the completion rate based on the completion limit.

26. The system of claim 23, wherein the evaluation parameters comprise a scheduling time for performing the evaluation task.

27. The system of claim 26, wherein the network evaluation computer is configured to automatically generate a request in conformance with the scheduling time.

28. The system of claim 23, wherein the network evaluation computer is configured to generate a request manually.

29. The system of claim 23, wherein the evaluation parameters comprise a name of a particular newsgroup topic that is to be evaluated, and wherein the newsgroup evaluation computer determines the newsgroup topic to calculate the completion rate by selecting the particular newsgroup topic named in the evaluation parameters.

30. The system of claim 23, wherein the network evaluation computer is further configured to:
save the date the completion rate was determined; and
save the time the completion rate was determined.

31. The system of claim 25, wherein saving the result of the newsgroup completion assessment comprises:
saving the completion grade.

32. The system of claim 22, wherein the network evaluation computer is further configured to:
plot the completion rate on a graph; and
display the graph.

33. The system of claim 22, wherein the network evaluation computer is further configured to:
create an entry in a database for the completion rate; and
record the completion rate in the entry.

34. The system of claim 33, wherein the network evaluation computer is further configured to:
plot the completion rate on a graph;
link a plot on the graph to the corresponding entry in the database;
display the graph;
activate a plot on the graph; and
display the corresponding entry for the plot.

35. The system of claim 25, wherein the network evaluation computer is further configured to:
create an entry in a database for the completion rate;
record the completion rate in the entry; and
record the completion grade in the entry.

36. The system of claim 25, wherein the network evaluation computer is further configured to:
plot the completion rate on a graph;
shade the plot on the graph a particular color for the particular completion grade of the plot; and
display the graph.

37. The system of claim 25, wherein the evaluation parameters include a list of notification addresses to contact for a completion grade that is a FAILURE, the network evaluation computer is further configured to send a notification to each notification address upon determining that a completion grade is a FAILURE.

38. The system of claim 37, wherein the notification address is an email address.

39. The system of claim 37, wherein the notification address is a telephone number.

40. The system of claim 37, wherein in the notification address is an instant messaging address.

41. The system of claim 25, wherein the evaluation parameters include a list of notification addresses and a minimum failure count, the network evaluation computer is further configured to:
after performing a series of newsgroup completion performance assessments, track the number of completion grades that are a FAILURE; and
after determining the number of the completion grades that are a FAILURE for the series, send a notification message to each notification address if the number is equal to or more than the minimum failure count.

42. A computer-readable medium having a computer program for assessing completion performance of a newsgroup service provided by a newsgroup server whereby the newsgroup server provides an on-line forum for users of an Internet Service Provider (ISP), the on-line forum having a plurality of interest groups such that one or more users of the ISP post newsgroup articles that are maintained by the newsgroup server on behalf of the ISP and at least one newsgroup article is transferred to a newsreader of a user, the program being embodied on a storage medium, wherein the program causes a computer to perform:
selecting a newsgroup topic as a subject of a newsgroup completion assessment to be used in evaluating a newsgroup server and quality of newsgroup service being provided by the newsgroup server to a service provider;
determining a current rate of completion of the newsgroup topic on the newsgroup server, the current rate of completion indicating a percentage of the total number of multipart newsgroup articles that have been delivered and stored on the newsgroup server with all of their sub-parts for the newsgroup topic such that a user may access all of the sub-parts and subsequently reassemble the sub-parts into a complete newsgroup article;
comparing the current rate of completion to a minimum completion limit and assigning a completion grade; and
saving the result of the newsgroup completion assessment so that the assessment of the newsgroup server may be subsequently conveyed to an interested party.

43. The medium of claim 42, the program further comprising:
receiving a request to perform the newsgroup completion assessment; and
determining a newsgroup topic for the newsgroup completion assessment by choosing a newsgroup topic that satisfies criteria stated in evaluation parameters.

44. The medium of claim 43, wherein the newsgroup completion assessment comprises:
calculating the completion rate of the newsgroup, the completion rate indicating a percentage of multipart newsgroup articles that are complete and can be successfully reassembled; and
displaying the completion rate.

45. The medium of claim 44, wherein the evaluation parameters include a minimum size limit of newsgroup articles that a newsgroup topic contains before the completion rate is to be calculated and a completion limit for comparing the completion rate against.

46. The medium of claim 43, wherein the evaluation parameters include a scheduling time for performing the completion assessment.

47. The medium of claim 46, wherein the request to perform the newsgroup completion assessment is automatically generated in conformance with the scheduling time.

48. The medium of claim 42, wherein performing of the newsgroup completion assessment is responsive to a manual request.

49. The medium of claim 43, wherein the evaluation parameters include a name of a particular newsgroup topic that is to be evaluated, wherein determining a newsgroup topic for the newsgroup completion assessment comprises:
   selecting the particular newsgroup topic named in the evaluation parameters.

50. The medium of claim 44, wherein calculating the completion rate of the newsgroup service comprises:
   determining the completion rate for the newsgroup service; and
   assessing a completion grade for the completion rate.

51. The medium of claim 44, wherein saving the result of the newsgroup completion assessment comprises:
   storing the completion rate;
   storing the date the completion rate was determined; and
   storing the time the completion rate was determined.

52. The medium of claim 50, wherein saving the result of the newsgroup completion assessment comprises:
   storing the completion rate; and
   storing the completion grade.

53. The medium of claim 44, wherein displaying the completion rate comprises:
   plotting the completion rate on a graph; and
   displaying the graph.

54. The medium of claim 50, wherein displaying the completion rate further comprises:
   plotting the completion rate on a graph;
   shading the plot on the graph a particular color for a particular completion grade; and
   displaying the graph.

55. The medium of claim 50, wherein the evaluation parameters include a list of notification addresses to contact for a completion grade that is a FAILURE, the program further comprising:
   after determining that a completion grade is a FAILURE, sending a notification message to each notification address.

56. The medium of claim 50, wherein the evaluation parameters include a list of notification addresses and a minimum failure count, the program further comprising:
   after performing a series of evaluation tasks, tracking the number of completion grades that are a FAILURE; and
   after determining the number of the completion grades that are a FAILURE for the series, sending a notification message to each notification address if the number is equal to or more than the minimum failure count.

* * * * *